3,353,940
METHOD OF FORMING GLASS BEADS IN A MOLTEN METAL BATH
Hans R. Dolf, Mercer Island, Wash., assignor to Selas Corporation of America, Dresher, Pa., a corporation of Pennsylvania
Filed May 7, 1965, Ser. No. 454,007
9 Claims. (Cl. 65—21)

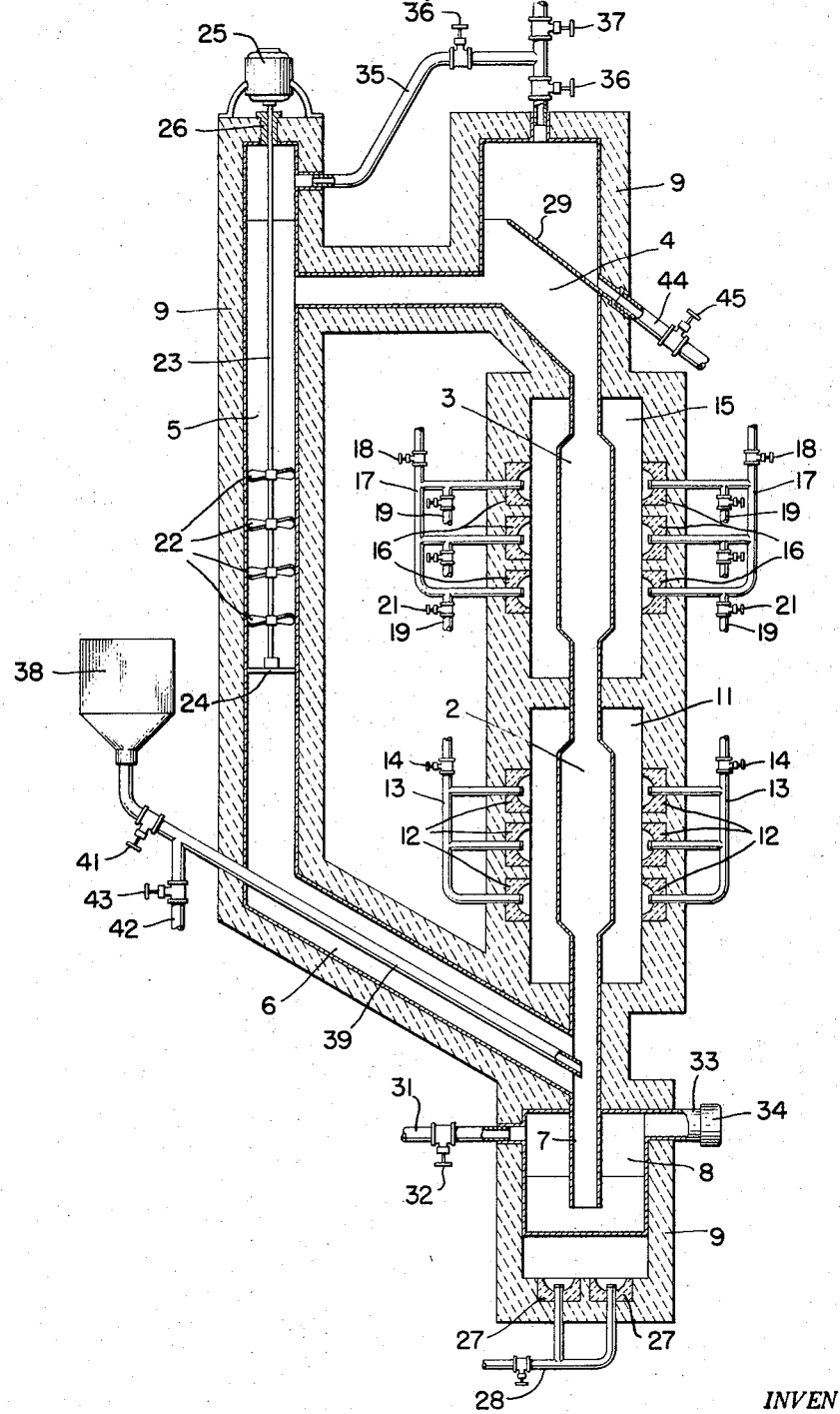

The present invention relates to the formation of glass beads, and more particularly to a method of forming glass beads in a molten metal.

At the present time most glass beads, such as those used for reflecting signs and in paint, are made by blowing crushed glass into a flame or blast of hot gases where it is suspended as it is softened. Surface tension of the glass draws the small particles into spherical form. They are then chilled and collected.

According to the present invention, ground glass is injected into a body of molten metal at a temperature somewhat above the softening temperature of glass. The glass being lighter than the metal, rises through the metal, and, as it is rising, softens sufficiently for surface tension to cause it to spheroidize. The upper portion of the metal body, while still molten, is at a temperature below the hardening temperature of glass, so that by the time the glass particles have reached the metal surface, they have solidified into spheres or beads.

It is an object of the invention to provide a novel method and apparatus for producing glass beads.

It is a further object of the invention to provide a method of manufacturing glass beads in molten metal.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

The single figure of drawing shows diagrammatically apparatus that can be used for carrying out the invention.

There is shown a metal jacket which forms a closed path through which liquid metal can be circulated. This jacket will be of some metal which will not react with the liquid metal at the temperatures encountered and, if the liquid metal is tin, the jacket can be a low carbon steel. The path formed by the jacket and through which the metal flows includes a hot chamber 2 that is connected to a cooler chamber 3 through which the metal flows vertically into a discharge chamber 4. This latter chamber has a horizontal outlet which extends to a vertical tube 5 and a sloping tube 6 which communicates with the lower end of chamber 2 to complete a circulating path. Metal is supplied to the path through a supply tube 7 which extends into a metal reservoir 8 that is preferably large enough to hold all of the metal in the circuit. The entire path through which the metal flows is jacketed in a suitable refractory insulation except that the refractory is spaced from chambers 2 and 3 to form combustion chambers for the purpose of heating these chambers.

Surrounding chamber 2 there is a combustion chamber 11 which is heated by burners 12 that are imbedded in the walls of the chamber. These burners can well be a series of rows of radiant cup type burners that are supplied with fuel from a manifold 13 with the fuel supply being regulated by valves 14. The cooler chamber 3 is surrounded with a combustion chamber 15 that can be heated by burners 16 which are preferably of the radiant cup variety and are placed in rows around the chamber. These burners are supplied with fuel from manifolds 17 that are controlled by valves 18. Since often it may be necessary to cool the liquid metal flowing through the chamber portion 3 of the closed path, each of these burners is also provided with an air inlet 19 which communicates with the fuel inlet so that cooling air may be injected into chamber 15. The amount of air that is supplied through the burners for cooling purposes, is controlled by a valve 21 in each of the air lines 19. Metal in the system is circulated through the path by an impeller which includes vanes 22 that are attached to a shaft 23 extending concentrically in the vertical portion 5 of the closed path. This shaft is journaled at its lower end in a strut 24 which extends across the path and is driven by a suitable motor 25 that is mounted on the upper end of the refractory covering. Shaft 23 extends through a gastight stuffing box 26 above the upper end of the path.

Metal in the reservoir 8 is heated by burners 27 which are directed against the lower portion of the reservoir and which are supplied with fuel through a pipe 28.

As the metal is moved through the closed path by impeller 22, it rises in chamber 4 and, carrying glass beads with it in a manner to be described below, is deflected by plate 29 toward the horizontal discharge from the chamber. An inert atmosphere is maintained above the level of the metal in chamber 4 and above the metal in vertical section 5 by means of an inert gas. These two areas are connected by an equalizing line 35 having valves 36 in it with the inert gas being supplied at suitable pressure through a pipe that is controlled by a valve 37.

Crushed glass or small pieces of cullet which are to be made into beads are introduced into the molten metal from a hopper 38 which connects with a glass supply tube 39 extending concentrically through sloping portion 6 of the metal path. The lower end of the inlet 39 has an opening in it through which the crushed glass is discharged upwardly into chamber 2. The glass may flow through pipe 39 under the force of gravity, but it may well be that pressure is needed to force the glass into the metal. To this end there is provided a valve 41 between the hopper and the tube and there is provided an inlet 41 for gas under pressure connecting with the tube 39 which inlet is controlled by a valve 43.

Metal is introduced into reservoir 8 through an opening 33 that is normally closed by a suitable cap 34. As the metal is melted it is forced upward through tube 7 into the circulating system by means of an inert gas that is forced into the reservoir above the metal level through a pipe 31, controlled by a valve 32.

In practicing the invention a relatively low melting point metal that will not react with glass at the temperatures encountered is used. It has been found that tin, which melts at 450° F., is satisfactory. In addition, the specific gravity of tin is several times that of most ordinary glass, so that the glass will readily rise through the tin.

The system is first purged with some inert gas such as argon or nitrogen. Metal in reservoir 8 is then melted and forced by pressure of gas introduced through inlet 31 into the circulating path. As the metal moves through chamber 2 it is heated to a temperature of from 1700° F. to 1800° F. by burners 12. The metal in chamber 3 is kept at a temperature of from 700° F. to 800° F. In order to accomplish this it is usually necessary to force air into chamber 15 through pipes 19. The amount of air can be regulated by valves 21. From time to time, however, as when the system is starting or idling, burners 16 are supplied with fuel to help keep the system sufficiently hot for the tin to remain molten.

The system is filled with metal until it has reached the upper edge of sloping plate 29. Motor 25 is started and impeller 22 continually circulates the metal downwardly in section 5 of the path, and upwardly through chambers 2 and 3. The impeller circulates the molten metal at a rate sufficient to prevent the relatively cooler metal in chamber 3 from moving down by gravity into chamber 2. The refractory insulation around the circuit is sufficient to prevent cooling of the metal enough so that it will not flow freely.

Crushed glass is supplied through tube 39, and is preheated by metal flowing through section 6 of the metal circuit. As the glass is discharged from the lower end of tube 39 it will rise upwardly in and with the flowing metal. The small particles of glass will be rapidly heated in the high temperature chamber 3 to a point where they will soften sufficiently so that the surface tension of the individual particles will pull or form them into spheres. For ordinary soda-lime glass this can occur at a temperature of about 1600° F. Continued vertical movement of the glass particles will carry them into the relatively cool chamber 3. At the temperature of this chamber the spheres will harden or solidify. Since they are moving individually in the metal, they will retain their spherical shape.

As the glass spheres or beads continue to rise they will move against the lower surface of plate 29 and slide along this surface. When the spheres reach the upper edge of plate 29 they will be pushed over the edge by other rising spheres and fall down the upper surface of the plate and into discharge tube 44. From time to time valve 45 will be opened to discharge the beads. If desired, the gas pressure in the upper portion of reservoir 8 can be such as to produce a continual slight overflow of metal over the upper edge of plate 29. This will make more positive the collection of the beads, but will require additional insulation, and perhaps heat, around discharge tube 44 to prevent solidifying of the metal until it is withdrawn and the beads separated from it.

While the process is in operation the liquid metal is protected from contamination and oxidization by the use of inert gas above the metal in the upper end of section 5 and in collection chamber 4. Inert gas can also be used, if necessary, to force the crushed glass down through tube 39 into the metal.

From the above it will be seen that I have provided a method of continuously forming glass spheres or beads and removing them from molten metal. This method will produce beads in reasonable quantities with excellent control of the temperatures that are necessary to obtain beads of a superior quality.

While in accordance with the provisions of the statutes I have illustrated and described the best form of embodiment of my invention now known to me, it will be apparent to those skilled in the art that changes may be made in the form of the apparatus disclosed without departing from the spirit and scope of the invention set forth in the appended claims, and that in some cases certain features of my invention may be used to advantage without a corresponding use of other features.

What is claimed is:

1. The method of forming glass beads which comprises introducing fine glass particles into a bath of molten metal at a temperature above the softening temperature of the glass whereby the particles will soften and be drawn by surface tension into spheres, moving the spheres through the metal to a zone having a temperature below the softening point of the glass whereby the spheres will solidify, and removing the solidified spheres from the molten metal.

2. The method of claim 1 in which the glass particles move substantially vertically upward through the molten metal.

3. The method of making glass beads which comprises providing a molten metal bath having a temperature gradient in different portions thereof from above the temperature required to soften glass to a temperature below the softening point of glass, introducing crushed glass to be spheroidized into the portion of the metal having the higher temperature thereby to soften the glass particles and permit them to form into spheres by the action of surface tension, moving the spheres to the lower temperature portion of the metal to permit them to solidify, and removing the spheres from the metal.

4. The method of making glass beads which comprises providing a body of molten metal having an upper exposed surface and a vertical temperature gradient with the temperature in the lower portion of the body being above the softening point of glass and the temperature of the upper portion being below the softening point of glass, said molten metal having a density greater than that of glass, introducing small particles of glass into the bottom of said body of metal, the glass softening and being drawn into spheres as it rises through said lower portion and the spheres freezing as they move through said upper portion, and collecting the glass spheres at the surface of said body of metal.

5. The method of claim 4 including the step of protecting said upper exposed surface from contamination with an inert gas.

6. The method of claim 4 including the step of forcing the glass particles into said body of metal under pressure.

7. The method of forming glass spheres which comprises circulating a stream of molten metal through a closed path, maintaining a first portion of said path at a temperature above the softening point of glass, maintaining a second portion of said path downstream of said first portion at a temperature above the temperature at which glass will soften, introducing crushed glass into said stream upstream of said first portion, moving the glass with said stream through said first and second portions, and removing the glass in the form of spheres downstream of said second portion.

8. The method of claim 7 including the step of preheating the crushed glass by transfer of heat from said stream prior to introducing said glass into said stream.

9. The method of claim 7 in which the metal in said stream flowing from upstream of said first portion to downstream of said second portion is moving vertically upward.

References Cited

UNITED STATES PATENTS

| | | | |
|---|---|---|---|
| 1,671,633 | 5/1928 | Podszus | 264—8 |
| 1,827,931 | 10/1931 | Blankenstein | 264—8 |
| 2,543,132 | 2/1951 | Shabaker | 264—8 |
| 3,207,818 | 9/1965 | Marshall | 264—14 |
| 3,207,818 | 9/1915 | Marshall | 264—14 |
| 3,272,893 | 9/1966 | Mogensen | 264—14 |
| 3,288,584 | 11/1966 | Long | 65—22 |
| 3,300,289 | 1/1967 | Long | 65—65 |

DONALL H. SYLVESTER, *Primary Examiner.*

G. R. MYERS, *Assistant Examiner.*